United States Patent [19]

Gregory

[11] Patent Number: 4,705,728

[45] Date of Patent: Nov. 10, 1987

[54] SOLID POLYMER ELECTROLYTE AND PRODUCTION METHOD

[75] Inventor: Thomas D. Gregory, Midland, Mich.

[73] Assignee: The Dow Chemical Company, Midland, Mich.

[21] Appl. No.: 922,920

[22] Filed: Oct. 27, 1986

Related U.S. Application Data

[63] Continuation-in-part of Ser. No. 895,094, Aug. 11, 1986, abandoned, which is a continuation of Ser. No. 799,700, Nov. 19, 1985, abandoned.

[51] Int. Cl.$^4$ .............................................. H01M 6/18
[52] U.S. Cl. ....................................... 429/192; 429/199
[58] Field of Search ................ 429/191, 192, 199, 30, 429/33; 252/62.2, 509; 204/421

[56] References Cited

U.S. PATENT DOCUMENTS

| | | | |
|---|---|---|---|
| 3,704,174 | 11/1972 | Berger | 429/192 |
| 4,060,674 | 11/1977 | Klemann | 429/194 |
| 4,139,681 | 2/1979 | Klemann | 429/191 |
| 4,303,748 | 12/1981 | Armand | 429/192 |
| 4,357,401 | 11/1982 | Andre | 429/192 |
| 4,505,997 | 3/1985 | Armand | 429/192 |
| 4,556,614 | 12/1985 | leMehaute | 429/191 |
| 4,578,326 | 3/1986 | Armand | 429/192 |
| 4,579,793 | 4/1986 | Armand | 429/192 |

OTHER PUBLICATIONS

Journal Electrochemical Society, Jul. 1986, pp. 1380-1385.

*Primary Examiner*—Anthony Skapars
*Attorney, Agent, or Firm*—Andrew E. Pierce

[57] ABSTRACT

An anionically conductive polymer electrolyte, solid at ambient temperature, containing a salt of the formula:

$$(R)_3CMX_n,$$

wherein M is selected from the group consisting of at least one of boron, phosphorus, antimony, and arsenic, wherein X is halogen, n is 4 or 6, and R is aryl of 6-18 carbon atoms, alkyl of 1-8 carbon atoms, or alkaryl of 7-26 carbon atoms. The polymer is derived from at least one monomer having at least one heteroatom in the monomer unit selected from oxygen, nitrogen, sulfur, and phosphorus. The electrolyte can be prepared by mixing the polymer and the salt together in the presence of a diluent or solvent and removing the diluent or solvent or by polymerizing a salt and monomer mixture utilizing a metal or a Lewis acid catalyst.

6 Claims, 5 Drawing Figures

SOLID POLYMER ELECTROLYTE AND PRODUCTION METHOD

CROSS REFERENCE TO RELATED APPLICATION

This is a continuation-in-part of application Ser. No. 895,094, filed Aug. 11, 1986 now abandoned which is a continuation of Ser. No. 799,700, filed Nov. 19, 1985, now abandoned.

BACKGROUND OF THE INVENTION

1. Field of the Invention

This invention relates to primary electrochemical cells utilizing an electrolyte comprising a solid polymer.

2. Description of the Prior Art

Aqueous electrolytes conventionally used as electrolytes in primary batteries, can be disadvantageous in that degradation of the electrodes can result by contact with said electrolytes. In addition aqueous electrolytes can be difficult to handle. Therefore solid electrolytes have been developed which have certain advantages including thermostability, absence of corrosion of the electrodes, and a wide range of redox stability which permits their combination with highly energizing couples to obtain electrochemical generators of high energy per unit of weight. Solid electrolytes are also advantageous because they can be prepared in thin layers which makes it possible to decrease the internal resistance of the electrochemical generator. Commercially available solid electrolyte battery systems utilize lithium iodide as the solid electrolyte since the lighter alkali metals, in particular lithium are the most attractive commercially utilized anode materials. Much research has been concentrated on lithium ion conductors as electrolytes but only little work has been done using alkaline earth metal ion conductors since the alkaline earth metal salts are poorly ionized. In a battery, the overall resistance of the fabricated electrolyte element limits the rate capability. In addition the volume taken up by a solid electrolyte such as lithium iodide is wasted space which could otherwise be devoted to active electrode components. Therefore, in order to maximize volumetric energy density and rate capability, the ability to fabricate a solid electrolyte as a thin element is important. Because, upon cell discharge, there is often a substantial redistribution of material in the cell and, in general, an overall volume change may occur, cell design must accommodate or minimize the stress on a thin, solid electrolyte element. In addition, the electrolyte must be compatible with the electrodes, both in the sense of being unreactive and also of making and maintaining electrical contact.

Solid polymer-salt complexes for use as electrolytes in electrochemical generators are known from U.S. Pat. No. 4,579,793, Armand at al. in which there are disclosed electrolytes of cross linked organometallic polymers in which lithium salts are dissolved. The solid polymer-salt electrolytes of U.S. Pat. No. 4,578,326 to Armand et al. are polyether copolymers which have been found to have improved conductivity over certain polyether homopolymers. Preferably sodium or lithium salts can be utilized as the ionic compound to be used in admixture with the polymer. The solid complexes of poly(ethylene oxide) and magnesium chloride which are disclosed by Yang et al. in J. Electrochemical Society, July 1986, pp. 1380–1385 appear to be principally anion conductors when used as electrolytes. Cross linked solid polymers of a cyclic ether in admixture with alkali metal salts of weak bases are disclosed in U.S. Pat. No. 4,357,401 to Andre et al. In addition, solid polymer electrolytes containing a salt the anion of which is a residue of derived from a strong acid and the cation of which is derived from an alkali metal or the ammonium ion are disclosed in U.S. Pat. No. 4,303,748 to Armand et al.

Novel alkali metal based ionic compounds are disclosed in U.S. Pat. No. 4,505,997 to Armand et al. in admixture with solid polymers as electrolytes. The polymers are derived from monomer units which include at least one heteroatom, particularly oxygen or nitrogen, in the structure. Solid electrolytes are disclosed in U.S. Pat. No. 4,556,614 to Mehaute et al. which include a first complexing polymer, an ionizable alkaline salt, and a second polymer having cross-linkable functions, for instance, a polymer of polyoxyethylene containing lithium perchlorate in admixture with a polymer of an acrylic modified polybutadiene-nitrile.

Complexes of lithium sodium or potassium salts and solid crown polyethers are disclosed as electrolytes in U.S. Pat. No. 3,704,174 to Berger. In U.S. Pat. No. 4,060,674 and U.S. Pat. No. 4,139,681 to Klemann electrolytes consisting of an organic solvent and an organo-metallic alkali metal salt are disclosed.

There is no indication in any of these references that useful electrolytes can be obtained from triphenylmethylhalo-borate, -arsenate, -antimonate, or -phosphate salts and solid polymers which provide anionic conductance at ambient temperature, i.e., 20° to 100° C.

It is an object of the invention to provide a solid electrolyte comprising a polymer-salt complex which provides anionic conductance. This is especially important where alkaline earth metal anodes are utilized an electrochemical cells in conjunction with the solid polymer-salt complex electrolytes since most salt solutions containing singly charged alkali metal ions are strongly ionized as compared with salt solutions containing doubly charged alkaline earth metal ions. The solid polymer-salt complex electrolytes are suitable for primary electrochemical cells operating at ambient temperatures such as 20° to 100° C. The electrolytes are particulary useful in combination with an alkaline earth metal anode such as an anode of magnesium or calcium. The polymer-salt complex electrolytes of the invention have good flexibility and provide high anionic conductivity when the ionic salt utilized in combination with the solid polymer is an organomethylhalo-borate, -arsenate, -antimonate, or -phosphate compound.

SUMMARY OF THE INVENTION

A polymer-salt complex electrolyte is disclosed which is useful in a primary electrochemical cell having an anode of an alkali or alkaline earth metal. The electrolyte is capable of providing anionic conductance and is particularly useful in electrochemical cells having an alkaline earth metal anode which operate at ambient temperatures of about 20° C. to about 100° C. The active cathode material of the cell is selected from at least one of the sulfides, halides, haloborates, haloarsenates and halophosphates of metals from groups Ib, IIb, IVa, Va, IVb, Vb, VIb, VIIb, and VIII of the Periodic Table of the Elements, quaternary tetralkylammonium polyhalides, or an element selected from the group containing of sulfur and iodine. The cathode can be, but need not be, a compound which intercalates the cation of which the anode is formed.

A useful method of forming the solid polymer-salt complex electrolyte is to form the polymer from a suitable monomer using a Lewis acid catalyst in the presence of an ionizing salt compound which is selected from at least one of a salt of the formula:

(R)$_3$CMX$_n$, wherein M is selected from the group consisting of at least one of boron, phosphorus, antimony, and arsenic, and wherein X is halogen, n is 4 or 6, and R is aryl of 6-18 carbon atoms, alkyl of 1-8 carbon atoms, or alkaryl of 7-26 carbon atoms. R is preferably phenyl.

The polymer is formed from a monomer comprising at least one heteroatom in the monomer unit such as a heteroatom selected from at least one of the group consisting of oxygen, nitrogen, sulfur, and phosphorus. Alternatively, the polymer-salt complex can be formed by dissolving said salt in a preformed polymer either by means of a solvent or by fusion techniques, if the polymer is thermoplastic.

DETAILED DESCRIPTION OF THE INVENTION AND THE PREFERRED EMBODIMENTS

Figure 1:
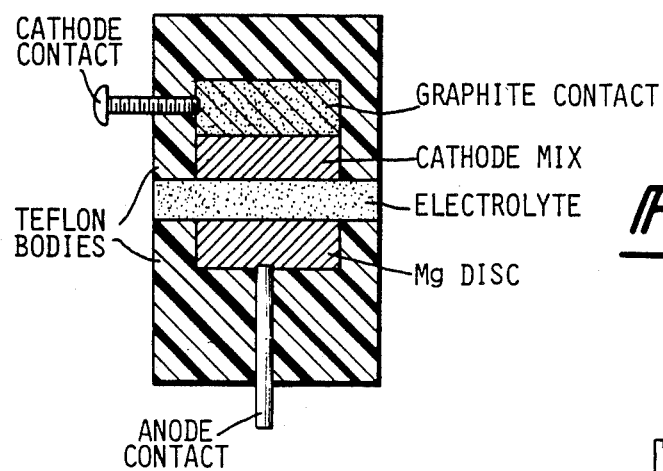
FIGS. 1 and 2 of the drawings show a schematic representation of a cell using a magnesium anode, one embodiment of a solid electrolyte of the invention prepared by polymerizing a mixture of triphenylmethyltetrafluoroborate, magnesium metal and tetrahydrofuran, and a cathode consisting by weight of 50% WS$_2$, 30% carbon black, and 20% polytetrafluoroethylene powder.
Figure 2:
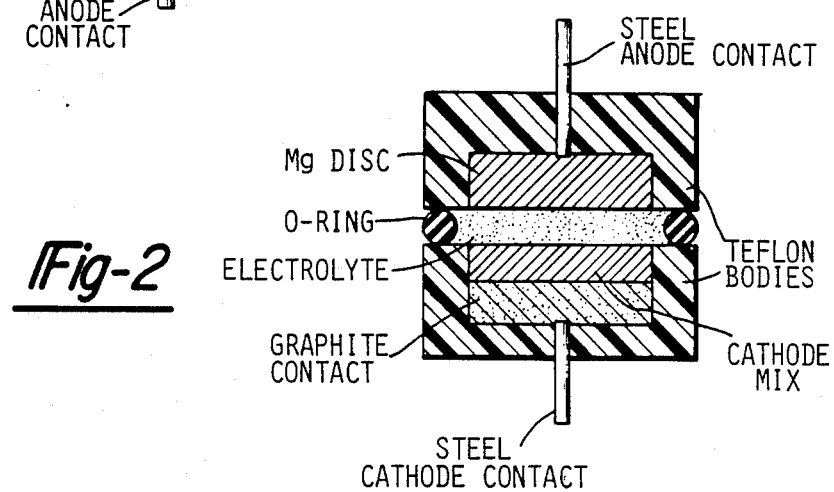

According to the present invention, there is provided an electrolyte which is a solid at ambient temperature, defined as about 20° C. to 100° C. Said electrolyte comprises an electrolytically active polymer and salt complex derived from at least one monomer comprising at least one heteroatom in the monomer unit and said salt is at least one of a salt of the formula:

(R)$_3$CMX$_n$ wherein M is selected from the group consisting of at least one of boron, phosphorus, antimony, and arsenic, wherein X is halogen, n is 4 or 6 and R is aryl of 6-18 carbon atoms, alkyl of 1-8 carbon atoms, or alkaryl of 7-26 carbon atoms. R is preferably phenyl.

The invention provides a solid electrolyte which can be used in a primary cell assembled, for instance, using a magnesium anode, a cathode comprised of a mixture of WS$_2$, graphite or carbon black, and polytetrafluoroethylene (PTFE). A solid electrolyte is prepared by first adding a sufficient amount of triphenylmethyltetrafluoroborate ((C$_6$H$_5$)$_3$CFB$_4$) to tetrahydrofuran to make a 1 molar solution. Magnesium turnings are added in excess to the mixture while stirring until the (C$_6$H$_5$)$_3$CBF$_4$ is completely dissolved and a dark liquid is formed. This liquid polymerizes to provide a black, rubbery solid polymer of empirical formula C$_{70}$H$_{110}$MgBF$_4$O$_{12}$. The solid polymer has an electrical conductance of about $10^{-4}$ ohm$^{-1}$ cm$^{-1}$ at room temperature.

When this rubbery solid polymer is compressed between a magnesium anode and a cathode made of WS$_2$, carbon black, and PTFE powder to form a cell, the cell generates an open circuit potential of about 2 volts, and currents of at least about 100 microamperes/cm$^2$ can be withdrawn at voltages greater than 1 volt.

Placing a small piece of the rubbery solid polymer material between a Mg ribbon and a piece of copper mesh results in the generation of an open circuit voltage of about 2 V. The AC conductivity at 1000 Hz of the solid polymer when compressed between copper and aluminum rods held apart by a fluoroelastomer O-ring (using externally applied voltage) was $9.5 \times 10^{-5}$ ohm$^{-1}$ cm$^{-1}$, according to the formula:

$$K = \left(\frac{1}{R_{1000\ Hz}}\right)\left(\frac{\delta}{A}\right)$$

Comparison of the S:W ratio for the used cathode material with that for unused WS$_2$ indicates a decline from 1.97 to 1.54, and the magnesium anode was coated with magnesium sulfide. The rubbery solid polymer electrolyte allowed S$^{--}$ ions formed at the cathode to migrate through the electrolyte to the anode. The electrolyte maintained its physical integrity as the anode and cathode volumes changed. It is clear from this that the solid electrolyte is an anionic conductor rather than the usual cationic conductor.

The polymer which forms a portion of the solid electrolyte of the invention is generally any homopolymer or copolymer, solid at ambient temperature, derived from at least one monomer comprising at least one heteroatom in the monomer unit such as oxygen, nitrogen, sulfur, and phosphorus. Preferred are monomers containing oxygen or nitrogen heteroatoms in the monomer unit and most preferred are the polymers of cyclic ethers or cyclic acetals such as tetrahydrofuran, 1,3-dioxolane, 1,4-dioxane, ethylene oxide, propylene oxide 1,2- or 2,3-butylene oxide. Useful monomer units include:

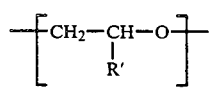

in which R' represents a hydrogen atom or one of the group R$_3$, —CH$_2$—O—R$_3$, —CH$_2$—O—R$_4$—R$_3$, —CH$_2$—N=(CH$_3$)$_2$, with R$_3$ representing an alkyl or a cycloalkyl radical including particularly 1 to 16, preferably 1 to 5 carbon atoms and $R_4$ representing a polyether radical of the general formula:

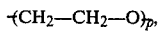

p having a value of 1 to 100, particularly from 1 to 2, or by the following formula:

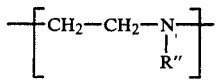

in which $R''$ represents $R_3$, —$R_4$—$R_3$, with $R_3$ and $R_4$ having respectively one of the above-indicated meanings, or by the following formula:

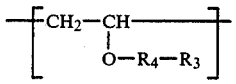

in which $R_3$ and $R_4$ have respectively one of the above indicated meanings, or by the formula:

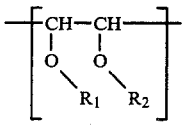

in which $R_1$ and $R_2$ are identical or different and each represent one of the groups $R_4$, $R_4$—$R_3$ with the above meanings, and $R_4$ can then also represent a polyether of the formula

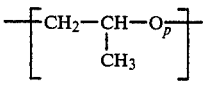

Preferably, the electrolyte comprises a cyclic ether copolymer particularly one derived from tetrahydrofuran and at least one of ethylene oxide or propylene oxide. The polymer can also be derived from cyclic acetals such as 1,3-dioxolane and 1,4-dioxane. Copolymers of tetrahydofuran and any of the cyclic acetals listed above are also suitable.

The polymers are preferably formed from the defined monomers in the presence of a metal or a Lewis acid catalyst. The solid electrolyte can be formed by adding said salt to a preformed polymer, as defined above, in the presence of a solvent or diluent for said polymer and subsequently removing said solvent or diluent or by adding said salt to said polymer rendered fluid by heating above its melting point. A Lewis acid is any molecule or ion (also called an electrophile) that can combine with another molecule or ion by forming a covalent bond with two electrons from the second molecule or ion. An acid is thus an electron acceptor. Hydrogen ion (proton) is the simplest substance that will do this, but many compounds, such as boron trifluoride, $BF_3$, and aluminum chloride, $AlCl_3$, exhibit the same behavior and are therefore properly called acids. Such substances show acid effects on indicator colors and then dissolved in the proper solvents. Generally, the useful catalysts are selected from the group consisting of metals or metal containing compounds. The preferred Lewis acid catalysts are metals selected from the group consisting of the alkali and alkaline earth metals, aluminum, and zinc. The polyhalides of aluminum, boron, vanadium, tantalum titanium, zirconium, and niobium are less preferred as catalysts.

As is well known in the prior art, the preferred polyether compounds of the invention can be produced by first reacting an initiator compound having active hydrogen atoms. By use of the term "active hydrogen atoms" there is meant any compound which gives a positive Zerewitinoff test. The term active hydrogen atoms is well known and clearly understood by those skilled in the art. However, to remove any possible ambiguity in this regard, the term active hydrogen atoms, as used herein includes any hydrogen atom fulfilling the following two conditions:
 (1) It is sufficiently labile to open the epoxide ring of 1,2-propylene oxide, and
 (2) It reacts with methyl magnesium iodide to liberate methane in the classical Zerewitinoff reaction (see Niederl and Niederl, Micromethods of Quantitative Organic Analysis, p. 263, John Wiley and Sons, New York city, 1946).

In utilizing the prior art procedures for making heteric or block copolymer polyethers, the 1,2-propylene oxide used therein can be replaced with tetrahydrofuran. The preferred initiators are those having up to 3 active hydrogen atoms and one to about eight, most preferably three (3) to about eight (8), carbon atoms. Representative examples of such compounds are water, monohydric alcohols such as phenol, cresol, ethyl alcohol, methyl alcohol, polyhydric alcohols such as hydroquinone, ethylene glycol, butylene glycol, diethylene glycol, glycerol or trimethylolpropane. A wide variety of suitable initiators and general procedures for making polyethers are illustrated, for instance, in U.S. Pat. Nos. 2,674,619 and 2,677,700, incorporated herein by reference.

As is well known from the prior art, particularly U.S. Pat. No. 4,578,326, solid polymers of ethylene oxide, because of the regular oxygen atom sequence in the polymer and the favorable oxygen/carbon atom ratio, have good solvation properties with respect to useful ionic salts which are dissolved therein so as to provide high conductivities for such solid electrolytes. But ethylene oxide polymers have a tendency to form crystalline structures at temperatures even above ambient temperature; the formation of crystallites occurring more easily as the concentration of the ionic salt dissolved therein is increased. The formation of crystallites in ethylene oxide polymers reduces the ionic conductivity of the solid polymer electrolyte and thus renders such polymers inappropriate for use at ambient temperatures in electrolytic cells. As disclosed in U.S. Pat. No. 4,578,326, useful polyether polymers can be prepared having lower crystallizing temperature and increased conductivity at ambient temperature than the homopolymers of ethylene oxide by the formation of copolymers of ethylene oxide and methyl glycidyl ether or propylene oxide. The polymer electrodes of the invention include homopolymers of substituted and non-substituted tetrahydrofuran and copolymers of tetrahydrofuran with other cyclic ethers as disclosed herein.

The molecular weight of the homopolymers or copolymers forming the solid polymer electrolyte utilized in the electric current producing primary electrochemical cell of the invention is at least about 50,000, preferably the molecular weight is about 100,000 to 1,000,000.

The ionic compound which is utilized in admixture with the polymer of a cyclic ether or cyclic acetal in the formation of the solid electrolyte is an ionic compound generally defined as a organohalo-borate -phosphate, -antimonate, or -arsenate having the formula:

$(R)_3CMX_n$ wherein M is selected from the group consisting of at least one of boron, phosphorus, antimony, and arsenic and wherein X is halogen, n is 4 or 6, and R is aryl of 6–18 carbon atoms, alkyl of 1–8 carbon atoms, or alkaryl of 7–26 carbon atoms. R is preferably phenyl. Preferably the ionic compound salt is incorporated with a suitable monomer or monomers and the mixture polymerized.

Alternatively, the ionic compound salt can be incorporated into a preformed polymer by mixing a solvent or diluent, which is subsequently removed, into the polyether polymer at ambient temperatures so as to solvate the polymer and thereby allow the incorporation of the ionic compound salt in admixture with the polymer.

Alternatively, a fusion process can be utilized to incorporate the ionic compound salt into a preferred polymer. In this process, the polymer is raised in temperature until it melts and becomes sufficiently fluid so as to permit the uniform mixture of the ionic compound salt therein. Preferably, the ionic compound salt is incorporated by forming the polymer from a mixture of at least one monomer and the ionic compund salt. The concentration of the ionic compound salt in the polymer is generally about 0.1 to about 5.0 molar, preferably about 0.5 to about 2 molar, and most preferably about 0.5 to about 1.0 molar of the ionic compound are utilized in admixture with the polymer.

An electric current producing primary electrochemical cell can contain an anode comprising an anode active metal selected from group Ia and IIa of the Periodic Table of the Elements, or aluminum. The anode active metal preferably is an alkali or alkaline earth metal and, most preferably is an alkali metal selected from the group consisting of sodium, potassium, lithium, or an alkaline earth metal, selected from the group consisting of magnesium and calcium. The anode active metal may be present in the anode in the form of an alloy of the metal with at least one other metal chosen from the groups Ia and IIa of the Periodic Table of the Elements or zinc or aluminum.

A cathode of the electric current producing primary electrochemical cell has a cathode active material comprising a compound selected from the group consisting of the sulfides, halides, haloborates, and halophosphates of elements from groups Ib, IIb, IVa, Va, IVb, Vb, VIb, VIIb, and VIII of the Periodic Table of the Elements or an element such as sulfur or iodine or a tetra-alkylammonium polyhalide, having 1,-6 carbon atoms in the alkyl group. While the anode active material can be in the form of a metal or an alloy thereof, as indicated above, the cathode is formed of cathode active materials which can be formed of compressed powders which may include a binder and particles of an electron conductor, such as carbon or graphite, dispersed therein in order to improve conductivity. The cathode binder can be polytetrafluoroethylene or other inert polymeric materials known to those skilled in the art.

Generally, the cathode active materials for a primary electric current producing electrochemical cell using the electrolyte of the invention are composed of those materials which do not give rise to a topochemical reduction reaction in which the preferred alkali metal or alkaline earth metal ions find their way into the structure of the cathode and are regenerated by chemical or electrochemical reduction. But the use of such materials as cathode active materials is not excluded. The materials which do not give rise to a topochemical reduction reaction generally provide considerably higher specific capacities than those which do and therefor these materials are well adapted to the manufacture of high energy density primary cells.

In practice, a primary electric current producing electrochemical cell can constitute a pile of compressed solid electrolyte pellets each suitably sandwiched between a pellet of the anode material and the cathode and separated by a thin film of the solid electrolyte disclosed herein.

In the preparation of the cathode of a primary electric current producing electrochemical cell, conventional methods are used in which powders of the cathode active material, graphite and/or carbon are pressed together in combination with a binder such as polytetrafluoroethylene or other polymeric binders known to those skilled in the art. Typically, from about 2% to about 30% by weight of such additives are used, including carbon or graphite and those additives employed as binders. The cathodes can be fabricated by pressing a mixture including such additives against a support structure such as a nickel or copper wire mesh.

The anode is fabricated in a conventional manner by attaching the anode active material to a supporting grid structure made of a material such as aluminum or nickel.

The following examples illustrate the various aspects of the invention. Where not otherwise specified throughout this specification and claims, temperatures are given in degrees centigrade and parts, percentages, and proportions are by weight.

EXAMPLE 1

A primary electric current producing electrochemical cell was assembled utilizing a magnesium anode and a cathode made by pressing together powdered tungsten disulfide, carbon black and polytetrafluoroethylene powder. The proportions by weight of the cathode were 50% tungsten disulfide, 30% carbon black, and 20% polytetrafluoroethylene. The solid electrolyte was prepared by reacting triphenylmethyltetrafluoroborate with tetrahydrofuran in the presence of magnesium in accordance with the following procedure:

A sufficient amount of triphenylmethyltetrafluoroborate $((C_6H_5)_3CBF_4)$ is added to tetrahydrofuran to make a 1 molar solution. Magnesium turnings were added in excess to the mixture while it was being stirred. After about 2 hours, the $(C_6H_5)_3CBF_4$ was completely dissolved and a dark liquid was formed. This liquid polymerized in about 48 hours to form a black rubbery solid having an electrical conductance of about $10^{-4}$ ohm$^{-1}$ cm$^{-1}$ at room temperature. The electrolyte is compressed in a thin layer between the magnesium anode and the cathode material in a disc area equal to approximately 0.713 cm$^2$, as shown by FIG. 1.

After preparing the electrolyte, the activity of the electrolyte was determined by placing a small piece of the solid electrolyte between a magnesium ribbon and a piece of copper mesh. An open circuit voltage of about 2.0 V was observed. The conductivity was measured by compressing a piece of the solid electrolyte between copper and aluminum rods held apart by a fluoroelastomer O-ring. An external voltage is applied across the gap between the two metals to measure the AC conductivity at 1000 Hz. The conductivity was $9.5 \times 10^{-5}$ ohm$^{-1}$ cm$^{-1}$, according to the formula:

$$K = \left(\frac{1}{R_{1000\ Hz}}\right)\left(\frac{\delta}{A}\right) \text{ or}$$

S = 0.131 cm
A = 0.519 cm$^2$
$R$1000 Hz = 2.66K ohm $$K = \left(\frac{1}{2.66 \times 10^3}\right)\left(\frac{0.131}{0.519}\right) = 9.5 \times 10^{-5} \text{ ohm}^{-1}\text{cm}^{-1}$$

The solid electrolyte polymer battery generated an open circuit potential of about 2 volts, and a current of at least about 100 microamperes/cm$^2$ Mg were withdrawn at voltages of 1 volt.

Current—Voltage data for this cell was:

| I, microamperes | i, microamperes/cm$^2$ | V, volts |
| --- | --- | --- |
| 10 | 14.0 | 1.88 |
| 20 | 28.1 | 1.81 |
| 30 | 42.1 | 1.69–1.73 ⎫ |
| 40 | 56.1 | 1.50–1.69 ⎬ erratic |
| 50 | 70.2 | 1.46–1.60 ⎭ |

Figure 3:
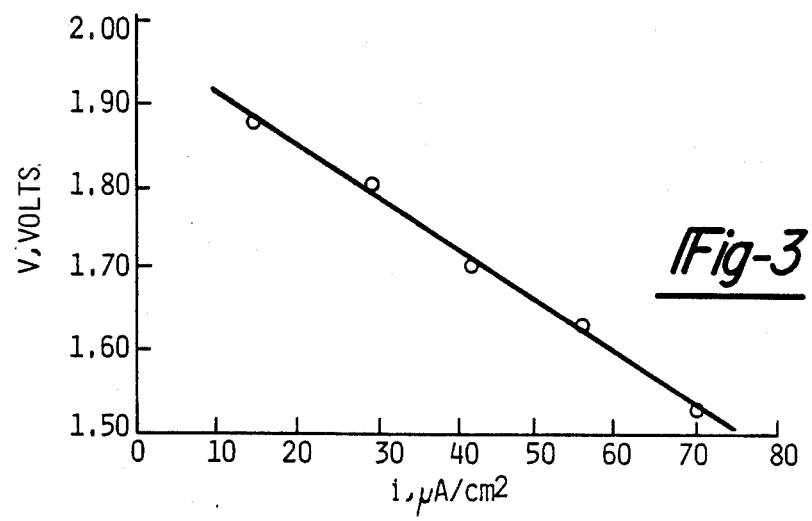
FIG. 3 is a graph showing current densities for a solid polymer electrolyte when used in a cell operating at normal room temperature ranges or approximately between about 20° C. and about 80° C., using a cathode, consisting by weight of 50% WS$_2$, 30% carbon black and 20% polytetrafluoroethylene powder.

The graph of FIG. 3 portrays some of this data.

The current densities shown are good for solid electrolyte cells operating at room temperature. While the cell was capable of current reversal, no evidence of a recharge capability was seen, although this resulted in an increased open-circuit potential. The cell was then discharged across a 100 ohm resistor for three days, with the cell voltage commencing at 0.25 V and slowly falling to 0.03 V at the end of this time. The open-circuit potential at this point was 1.49 V, and indicated a slow degradation of either the electrolyte (possible air oxidation), the cathode, or the anode (possible passivation).

The appearance of the cathode and electrolyte were unchanged upon cell disassembly, but the Mg anode was covered with a yellow-white powder. The deposit on the anode surface and the used cathode material were analyzed via Energy Dispersive Spectroscopy (EDS), and yielded an X-ray spectrum which showed a comparison of the S:W ratio for the used cathode material with that for WS$_2$ which declined from 1.97 (for WS$_2$) to 1.54 (for used cathode). The anode deposit appeared to be magnesium sulfide. From this data, it is clear that the solid electrolyte allowed S$^{--}$ ions formed at the cathode to migrate to the magnesium anode and react and therefore the electrolyte is an anion conductor, as opposed to most solid electrolytes (with the exception of F$^-$ conductors such as CaF$_2$) which are anion conductors.

EXAMPLE 2

A battery was assembled as in Example 1, using 80% by weight of CuS and 20% by weight of PTFE as the cathode material.

Current density-Voltage data for the first discharge of this battery is as follows:

| i, microamperes/cm$^2$ | V, volts |
| --- | --- |
| 0 | 1.10 |
| 14.0 | 0.78 |
| 28.1 | 0.58 |
| 42.1 | 0.46 |
| 56.1 | 0.35 |
| 70.2 | 0.24 |

After an overnight "charge" @ 3.5 microamperes/cm$^2$ the current density-voltage data for the second discharge is:

| i, microamperes/cm$^2$ | V, volts |
| --- | --- |
| 0 | 1.30 |
| 14.0 | 0.69 |
| 28.1 | 0.39 |

Figure 4:
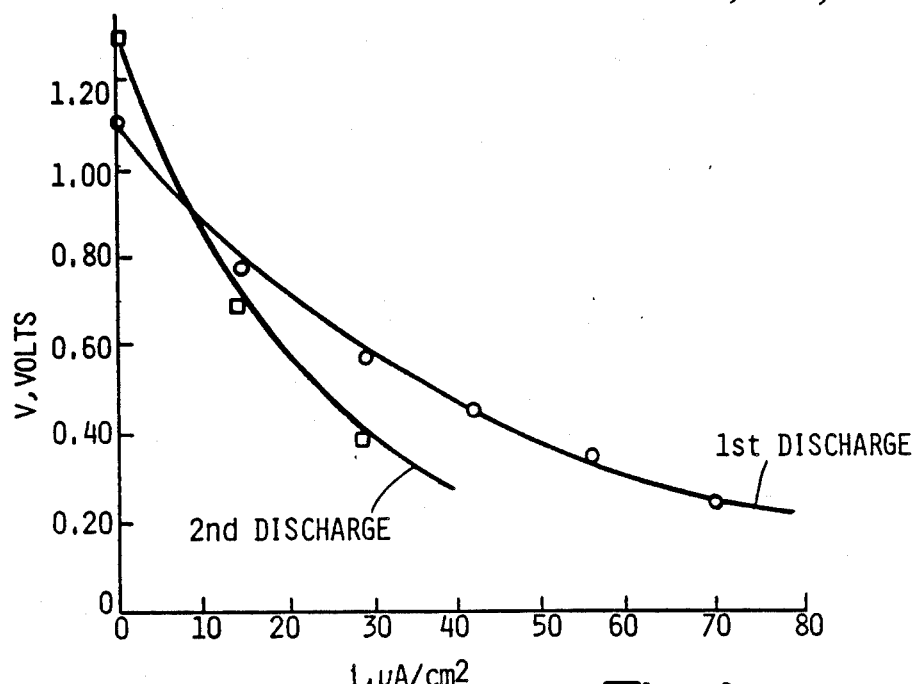
FIG. 4 is a graph showing current densities for one embodiment of the solid polymer electrolyte of the invention operating at normal room temperature ranges using a cathode consisting by weight of 80% CuS and 20% polytetrafluoroethylene.

The graph of FIG. 4 sets forth the data for this battery using by weight 80% CuS/20% PTFE as the cathode material.

The main mode of discharge for this reaction is probably Mg+CuS MgS+Cu. E° for this reaction is 1.5 V. Therefore, the open circuit voltage of this cell was somewhat lower than E° for the proposed reaction, and this cell also polarized more than the Mg/WS$_2$ cell; therefore, the cathode appears to be a poorer conductor than the cathode in Example 1. After disassembly, the Mg surface again showed a yellow-white coating, which looked identical to that seen in the previous cell, but this coating was not analyzed.

An attempt was made to assemble a Mg/S solid electrolyte battery, where the cathode was made by making a depression in the end of a ½" graphite rod, filling it with powdered graphite, and dripping S dissolved in CS$_2$ onto it and allowing the CS$_2$ to evaporate. While this produced an adherent cathode and an open circuit voltage (O.C.V.) of 1.29 V, the cell polarized severely.

EXAMPLE 3

A battery was assembled as in Example 1, using 50% by weight of AgBF$_4$, 30% by weight of graphite and 20% by weight of PTFE as the cathode material.

Figure 5:
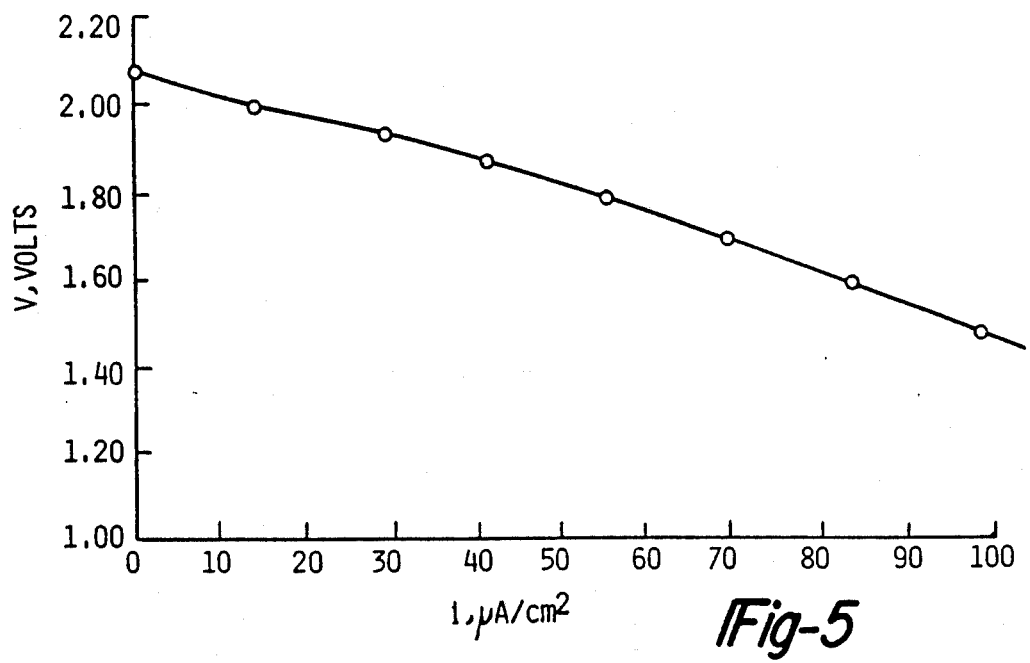
FIG. 5 is a graph showing current densities for a solid polymer electrolyte operating in a cell at normal room temperature ranges using a cathode consisting by weight of 50% AgBF$_4$, 30% graphite and 20% polytetraflurorethylene.

Current density—Voltage data for this battery is shown in FIG. 5.

The open circuit voltage and the polarization characteristics were better than the cells in Examples 1 and 2, however, after several hours, the voltage became erratic, apparently because of decomposition of the cathode. (The cathode material shows a hygroscopic character after standing in air several days).

The cell voltage was still stable during a relatively-high rate discharge (about 70 microamperes/cm$^2$), but would always become erratic on open circuit or at low discharge rates.

Based upon the above examples, it is apparent that the battery operates by generating anions at the cathode which are transported through the electrolyte. The anions react with the Mg anode to form a Mg salt, and electrons are released to flow through an external circuit.

Preferably, the solid electrolytes of the invention useful in a primary battery are prepared by adding a sufficient amount of a triphenylmethyl compound from the group (C$_6$H$_5$)$_3$CBF$_4$, (C$_6$H$_5$)$_3$CBX$_4$, (C$_6$H$_5$)$_3$CPX$_6$, (C$_6$H$_5$)CSbX$_6$, and (C$_6$H$_5$)$_3$CAsX$_6$, where X is a halogen, to a suitable monomer, preferably a cyclic ether, to make a 1 molar solution. A metal, such as alkali or alkaline earth metal turnings, are added in amounts equal to or greater than the quantity of triphenylmethyl compound as the mixture is being stirred. The triphenylmethyl compound is completely dissolved in about 2 hours, and this is evidenced by the formation of a dark liquid. The liquid is allowed to stand at normal room temperature ranges, whereupon it polymerizes into a black rubbery solid in about 2 days. The electrical conductance of these solids is about $10^{-4}$ ohm$^{-1}$ cm$^{-1}$, which is within the acceptable range of room temperature operational solid electrolytes. These can have a conductivity greater than about $10^{-3}$ ohm$^{-1}$ cm$^{-1}$ at room temperature down to a conductivity of about $10^{-7}$ ohm$^{-1}$ cm$^{-1}$.

While any of the mentioned triphenylmethyl compounds are useful, a triphenylmethyltetrahaloborate is preferred. Among the triphenylmethyltetrahaloborates, triphenylmethyltetrafluoroborate is most preferred.

In addition to cyclic ethers and cyclic acetals, straight chain aliphatic and aromatic ethers, such as dialkoxyalkanes and acetals are useful. However, the cyclic ethers and cyclic acetals are preferred. Tetrahydrofuran is most preferred.

While any of the alkali and alkaline earth metals will work as anodes in the inventive battery, the alkaline earth metals are preferred. Among the alkaline earth metals, magnesium and calcium are most preferred.

Normal or surrounding room temperatures, as intended within the purview of the invention, will range from about 20° C. to about 100° C. and the capacity of the cell to exhibit anionic conductance is operable when the electrolyte and cell temperatures are within this range; however, it is preferred that the temperatures be within the range of between about 25° C. to about 50° C.

It is to be understood that the foregoing disclosure relates to specifically preferred embodiments of the instant invention, and it is intended to cover in the appended claims all of the variations and modifications of the invention which do not depart from the spirit and scope of the invention.

The embodiments of the invention in which an exclusive privilege or property is claimed are defined as follows:

1. An anionically conductive solid polymer and salt complex electrolyte, solid at a temperature of about 20° C. to about 100° C., wherein said polymer and salt electrolyte comprise:
   A. at least one polymer derived from at least one monomer comprising at least one heteroatom in the monomer unit and
   B. at least one ionizing salt comprising a salt of the formula:

$(R)_3CMX_n$ wherein M is selected from the group consisting of boron, phosphorus, antimony, and arsenic, X is halogen, n is 4 to 6, and R is aryl of 6–18 carbon atoms, alkyl of 1–8 carbon atoms, or alkaryl of 7–26 carbon atoms.

2. The electrolyte of claim 1 wherein said polymer is derived from monomer units wherein said heteroatom is selected from at least one of the group consisting of oxygen, nitrogen, sulfur, and phosphorus, and R is phenyl.

3. The electrolyte of claim 2 wherein said polymer is a homopolymer or copolymer comprising monomer units derived from at least one monomer selected from the group consisting of tetrahydrofuran, 1,3-dioxolane, 1,4-dioxane, ethylene oxide, propylene oxide, and butylene oxide.

4. The electrolyte of claim 3 wherein said polymer is obtained by polymerizing at least one of said monomers in the presence of at least one initiator compound and a metal or Lewis acid catalyst.

5. The electrolyte of claim 4 wherein said M is boron and wherein said halogen is fluorine.

6. The electrolyte of claim 5 wherein said polymer comprises a polymer of tetrahydrofuran or 1,3-dioxolane and said catalyst is selected from at least one of an alkali or an alkaline earth metal, aluminum and zinc.

* * * * *

UNITED STATES PATENT AND TRADEMARK OFFICE
CERTIFICATE OF CORRECTION

PATENT NO. : 4,705,728

DATED : November 10, 1987

INVENTOR(S) : Thomas D. Gregory

It is certified that error appears in the above-identified patent and that said Letters Patent is hereby corrected as shown below:

Col. 1, line 56, "at" should read -- et --.

Col. 2, line 36, "an" should read -- in --;

line 45, "particulary" should read -- particularly --;

lines 67-68, "containing" should read -- consisting --.

Col. 5, line 46, "tetrahydofuran" should read -- tetrahydrofuran --;

line 64, "then" should read -- when --.

Col. 7, line 30, "compund" should read -- compound --.

Col. 12, line 18 (Claim 1), "to" should read -- or --.

Signed and Sealed this

Twenty-third Day of August, 1988

Attest:

DONALD J. QUIGG

Attesting Officer   Commissioner of Patents and Trademarks